K. DOUGAN.
WHEAT STEAMER.
APPLICATION FILED JULY 13, 1916.
1,345,840.
Patented July 6, 1920.
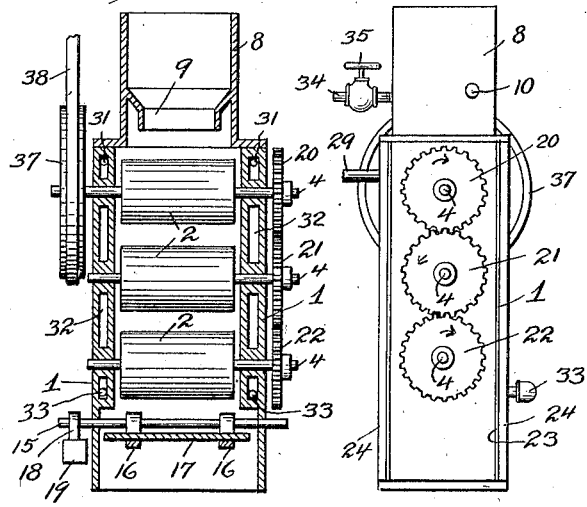
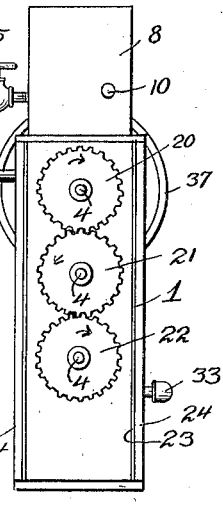
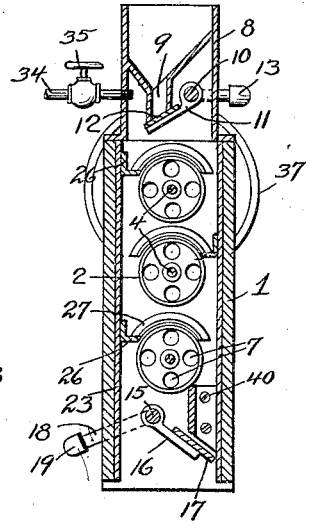
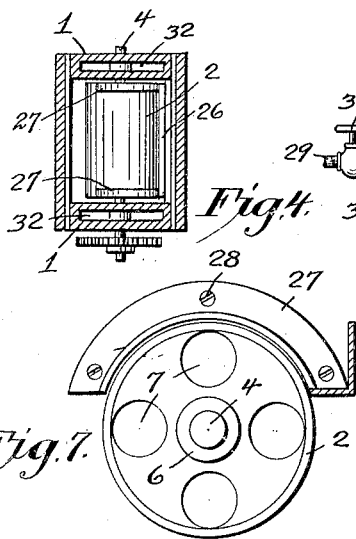
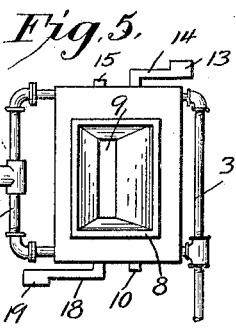
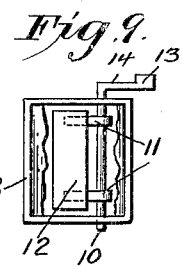
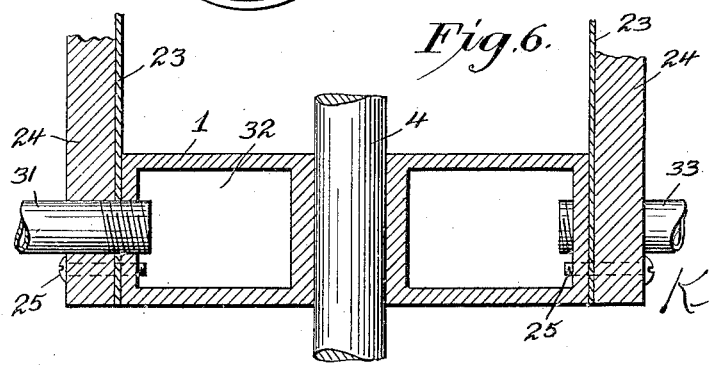
Inventor:
Kennedy Dougan

UNITED STATES PATENT OFFICE.

KENNEDY DOUGAN, OF MINNEAPOLIS, MINNESOTA.

WHEAT-STEAMER.

1,345,840.  Specification of Letters Patent.  Patented July 6, 1920.

Application filed July 13, 1916. Serial No. 109,012.

*To all whom it may concern:*

Be it known that I, KENNEDY DOUGAN, a citizen of the United States, and a resident of Minneapolis, Hennepin county, Minnesota, have invented new and useful Improvements in Wheat-Steamers, of which the following is a specification.

My invention relates to improvements in wheat steamers and the objects of my improvements are, to provide a steamer that will steam wheat uniformly, that will not choke periodically, and in which the wheat will be exposed to the action of the steam much longer than in wheat steamers now in use.

In my steamer, the wheat is delivered on to a slowly rotating roller and from that to a second roller located beneath the first roller, and from the second to a third roller.

I attain the objects of my invention by the mechanism illustrated in the accompanying drawings, in which:

Figure 1 is an elevation of the steamer; Fig. 2 a vertical central section at right angles to Fig. 1. Fig. 3 is a vertical transverse section. Fig. 4 is a horizontal section between any two of the rollers. Fig. 5 is a plan view of the steamer with some parts omitted. Figs. 6, 7 and 8 are detached views on an enlarged scale. Fig. 9 is a plan view of hopper 8 with bottom broken away.

The invention consists, first of means for getting the wheat into and out of the steaming chamber without allowing the steam to escape; second, means for heating the steamer before steam and wheat are turned into the wheat steaming chamber, and third, means for passing wheat slowly through the steam in the steaming chamber.

Similar numerals refer to similar parts throughout the several views.

1—1 are rectangular shaped hollow steam-tight heads of cast iron spaced apart as shown and between which the rollers 2 which are hollow rotate slowly in bearings 3 cast integral with heads 1. 4, 4, 4 are shafts to which are secured the rolls 2; 5 are heads which fit the interior of cylinders 2 and are provided with hubs 6 which fit shafts 4. There is one of these heads 5 at each end of each roll. 7 are holes formed in heads 5 to allow of the escape of any water that might gain entrance in the form of steam and cause trouble by subsequent freezing. 8 is a hopper secured to the upper ends of heads 1. The wheat is delivered into this hopper and passes down into the steaming chamber through spout 9. 10 is a shaft passing through both walls of hopper 8. Rigidly secured to shaft 10 are fingers 11 to which is rigidly secured a rectangular plate 12 shown in detail in Fig. 9 attached to shaft 10. 13 is a weight secured to the outer end of lever 14 which is rigidly secured to shaft 10. When wheat accumulates in hopper 8 to a sufficient depth, its weight overcomes the downpull of weight 13 and wheat flows into the steaming chamber, sufficient wheat always remaining in hopper 8 to form a seal against the escape of steam from the steaming chamber. A similar device is placed at the lower end of the steamer to prevent escape of steam while allowing wheat to discharge. In this device 15 is the shaft, 16 the fingers, 17 the plate, 18 the lever, and 19 the weight. 20—21 and 22 are intermeshing spur gears secured to shafts 4 carrying the rollers 2. 23, 23 are rectangular sheet metal covers. In order to prevent radiation of heat wooden covers 24 are secured to the outside of covers 23, and the whole secured to heads 1 by screws 25 as shown in Fig. 6. 26 are shelves preferably secured to and carried by sheet metal covers 23. The wheat is discharged from hopper 8 on to the upper shelf 26, carried over to the right by upper roller 4, falls on middle shelf 26, is carried to the right by lower roller 4 and discharged as hereinbefore explained. The arrows indicate the direction in which the rolls rotate.

To prevent wheat from working down between the ends of rollers 2 and heads 1, each end of each roller 2 is shielded on its upper side by a flange 27 which is secured by screws 28 to head 1. This flange 27 is spaced away slightly from roller 2. This is clearly shown in Fig. 7 which is an enlarged detached view of one end of a roll 2, and shaft 4, head 5 and shows shield 27. Fig. 8 is a cross-section of shield 27.

29 is a steam supply pipe, 30 a throttle valve and 31 steam connections from valve 30 to the steam space 32 formed in each head 1. This is clearly shown in Fig. 6. 33 as a whole shows means for discharging steam or the water of condensation from heads 1. 34 is a steam supply pipe, 35 a throttle valve and 36 a pipe through which steam is delivered into the wheat steaming chamber; by wheat steaming chamber is meant the chamber containing the rolls 2 and in which steam and wheat mingle.

37 is the driving pulley which is secured to shaft 4 of the upper roller, and is driven by belt 38, and 39 is a partition across the steaming chamber and is secured at both ends by screws 40 to the heads 1. This is shown only in Fig. 3.

The operation is as follows:

Some minutes before putting the steamer into operation, that is to say, before turning wheat into the steamer, steam is admitted through valve 29 to the interior of heads 1 which becoming hot, heat by radiation the rolls 2 and other parts in the steaming chamber. Were steam turned into the steaming chamber without the pre-heating described, steam would condense and produce a volume of water that would be ruinous to the machine to which the steamer would discharge. Wheat steamers are usually placed directly above and close to the grinding rolls. The passage of the wheat through the steamer has hereinbefore been described. The steaming is regulated by hand valve 35. After the steamer has been thoroughly heated in the manner described steam may be shut off from heads 1 by closing valve 29; this will result in greater condensation and add more moisture to the wheat. This is sometimes thought desirable.

I claim:

1. The combination in a wheat steamer, of a steaming chamber, having hollow ends, and removable sides, having inwardly extending horizontal shelves rigidly secured thereto, a plurality of rollers rotatable in said steaming chamber disposed one above the other and spaced apart, each roll adapted to be rotated in a direction opposite to that of the one immediately above it, each of said rolls being rigidly secured to a shaft having its ends rotatable in bearings in said hollow ends, said horizontal shelves closing the spaces between one side of each of said rolls and said sides, and means for rotating said shafts.

2. In a device for steaming wheat, a plurality of hollow walls forming the opposite ends of a steaming chamber, a roll journaled in said walls, means for conducting steam into said walls, independently controlled means for conducting steam into said steaming chamber, and means for rotating said roll.

3. In a device for steaming wheat, a plurality of hollow walls forming the opposite ends of a steaming chamber, a plurality of superposed rolls journaled in said walls, means for conducting steam into said walls, independently controlled means for conducting steam into said steaming chamber, and means for rotating said rolls.

4. In a device for steaming wheat, a plurality of walls forming the opposite ends of a steaming chamber, side walls, a roll journaled in said end walls, a bracket on one of said side walls overlying a portion of said roll and in close proximity thereto, and gravity operated means for deflecting the wheat to said bracket and for preventing exit of steam from the upper portion of said chamber.

5. In a device for steaming wheat, a plurality of hollow walls forming the opposite ends of a steaming chamber, removable side walls, a plurality of superposed rolls each having a diameter greater than half the width of said walls journaled in said walls, a bracket placed over each roll closing alternately one or the other of the narrow passage ways between the rolls and the side walls, and means for conducting steam into said walls and into said steaming chamber, and means for rotating said rolls.

6. In a device for steaming wheat, a plurality of hollow walls, a plurality of removable side walls adapted to be secured to said hollow walls to form a steaming chamber, a hollow roll journaled in the hollow walls, and independently adjustable means for delivering steam either alternately or simultaneously to said hollow walls and to said steam chamber and said hollow roll.

7. In a device for steaming wheat, a plurality of steam heated hollow rolls geared to revolve alternately in opposite direction, each of said rolls having a diameter greater than half the width of the chamber, and having their axes in the same vertical plane, means for closing the space between each alternate roll and one of the walls parallel to the axis of said roll and means for closing the passage between the opposite wall and the other of said rolls, whereby the wheat is moved in zigzag direction through the steaming chamber.

July 11th, 1916.

Signed: KENNEDY DOUGAN.

Witnesses:
  S. SHUFELDT,
  FRED GARDNER.